United States Patent [19]
de Fontenay

[11] Patent Number: 5,232,209
[45] Date of Patent: Aug. 3, 1993

[54] MACPHERSON STRUT ASSEMBLY OR THE LIKE

[75] Inventor: Etienne de Fontenay, Decize, France

[73] Assignee: Caoutchouc Manufacture et Plastiques S.A., Versailles, France

[21] Appl. No.: 803,469

[22] Filed: Dec. 4, 1991

[30] Foreign Application Priority Data

Dec. 13, 1990 [FR] France .................... 90 15748

[51] Int. Cl.⁵ .................................... B60G 13/00
[52] U.S. Cl. ................... 267/220; 267/140.13; 280/710
[58] Field of Search .......... 267/219, 220, 140.11, 267/140.12, 140.13, 35, 276, 282; 280/673, 710, 716; 248/560

[56] References Cited

U.S. PATENT DOCUMENTS

| | | | |
|---|---|---|---|
| 3,222,083 | 12/1965 | Stotz et al. | 267/276 X |
| 4,399,974 | 8/1983 | Takei | 267/35 X |
| 4,673,192 | 6/1987 | Krehan et al. | 267/220 X |
| 4,739,979 | 4/1988 | Kanda | 267/140.12 |
| 4,877,262 | 10/1989 | Tanahashi et al. | 280/710 X |
| 5,024,461 | 6/1991 | Miyakawa et al. | 267/219 X |

FOREIGN PATENT DOCUMENTS

| | | |
|---|---|---|
| 0249369 | 12/1987 | European Pat. Off. . |
| 0268785 | 6/1988 | European Pat. Off. . |
| 3034743 | 4/1982 | Fed. Rep. of Germany . |
| 2255508 | 12/1973 | France . |
| 2563302 | 4/1985 | France . |
| 2583126 | 6/1986 | France . |
| 2587774 | 9/1986 | France . |
| 2623866 | 11/1988 | France . |
| 61-45131 | 3/1986 | Japan . |
| 4015549 | 1/1989 | Japan .................... 267/140.13 |
| 1-135940 | 5/1989 | Japan . |
| 2-169313 | 6/1990 | Japan . |

Primary Examiner—Robert J. Oberleitner
Assistant Examiner—Kevin D. Rutherford
Attorney, Agent, or Firm—Thomas N. Ljungman

[57] ABSTRACT

A MacPherson Strut assembly, or the like, with a hydroelastic suspension attachment in which the attachment is formed by two thick membranes of elastomeric composition which enclose a liquid. This unit forms a hydroelastic cartridge in which a sliding flap, provided with sealing joints, can move within a rigid confinement cup. The flap itself is encircled by a liquid passage having a large cross section clearance which causes a high level damping of vibrations which result from the resonant movement between masses between which the suspension attachment is mounted.

18 Claims, 5 Drawing Sheets

MACPHERSON STRUT ASSEMBLY OR THE LIKE

BACKGROUND OF THE INVENTION

1. Field of the Invention

This invention relates to a MacPherson Strut assembly for wheel suspensions of motor vehicles, and more particularly to the area of elastic attachments for the MacPherson Strut assembly. Such attachments, in addition to being usable for wheel suspensions, can also be used for mounting engines, as well as for suspensions of stationary machines. More precisely, this invention includes the incorporation of hydraulic damping into the elastic connections of suspension attachments for the upper point of attachment of a shock absorber to a vehicle frame or chassis. In such MacPherson units, the shock absorber must also serve as the steering pivot. In addition, the invention also involves the application of a hydraulically damping suspension attachment as a so-called anti-torque link for the suspension of a power unit on a frame.

2. Background Information

The structure of automobile vehicle suspensions has become more and more standardized. The term "strut" is generally used for the unit carrying the helicoidal spring associated with a telescopic shock absorber. The ability of the shaft of this shock absorber to rotate provides the steering pivot in a front wheel drive vehicle which has MacPherson struts.

A MacPherson strut system is generally used on most subcompact and compact cars with front wheel drive. The MacPherson system features a long telescopic shock absorber strut surrounded by a coil spring. The upper end of the strut is generally isolated by a rubber vehicle mount that contains an oil-free ball bearing which allows for the turning of the wheel, while the lower end of the strut is typically attached to the steering knuckle of the lower control arm ball joint. The lower control arm can be attached to the underbody side apron of the vehicle, or to the lower side rails of the vehicle, and is also typically attached to the steering knuckle. A stabilizer bar can also be connected to both lower control arms and the front vehicle crossmember. It is also possible to have adjustable strut bars connecting the control arms to the subframe of the vehicle. This lower connecting and stabilizing structure in such a suspension system is typically referred to as the lower guide triangle.

Regardless of whether the lower guide triangle incorporates an anti-roll bar, the presence of a ball joint at the outer point of the guide triangle provides the possibility of simultaneous vertical deflection and pivoting of the shock absorber tube carrying the axle of the front wheel. The use of such a similar suspension can also be encountered in rear axle suspensions where either the microdeflections of a sophisticated triangulation, or the geometric configuration of a true steering layout for vehicles with four-wheel steering, are permitted by the existence of the ball joint.

Thus, the geometrical configuration of a front suspension, as well as that of a rear suspension, can be determined by the attachment of the upper end of a shock absorber shaft to the vehicle body. The shock absorber tube and the steering knuckle pivot are pivotable about the shaft in a manner guided by the triangle of the MacPherson system.

Under somewhat analogous conditions, an anti-torque link of an engine suspension can provide a reaction to engine forces in an essentially horizontal direction.

In known wheel suspensions of classic suspension systems, when a coil spring provides the vertical flexibility of the wheel suspension, the pivoting of the wheel suspension is permitted by a complementary support of a suspension cup, generally the upper cup, on a ball thrust bearing which transmits the permanent load to the vehicle body.

This complementary attachment requires, like the attachment of the shock absorber shaft concentric therewith, a filtering of vibrations to limit the vibrations transmitted through the spring. This function is generally provided by pieces of vulcanized rubber that are intimately connected to the cup and to a corresponding attachment sleeve.

The two concentric, elastic pieces which provide the limiting of vibration transmissions can complement each other to provide an improvement which constitutes the subject matter of numerous publications.

European Patent No. 0,249,369 to General Motors, for example, describes a device which exclusively improves the elastic connection between the shock absorber shaft and the chassis.

The device of European Patent No. 0,249,369 limits dynamic deformations by means of thrust washers, whereas the stresses of the vertical limit of travel on a shock absorber thrust bearing can be exerted by means of another rigid cup. The permanent load, in this case, is transmitted elsewhere in this arrangement.

Likewise, French Patent No. 2,583,126 to Honda describes a device which incorporate a roller thrust bearing for carrying the permanent load of the suspension spring. This device, however, only provides a good filtering of acoustic vibrations for the shock absorber shaft by means of a "vibration neutralizer".

In contrast, the device described in German Patent No. 3,034,743 to Continental combines, via a roller thrust bearing, in one complex piece, the permanent support of the suspension spring as well as the elastic ring where the connecting force is exerted in a dynamically alternating manner between the shock absorber shaft and the support on the body. More particularly, this German patent is basically directed to the environment of the ball thrust bearing. Because of this design, the stresses of the dynamic limit of travel are exerted on the attachment of the shock absorber shaft due to the presence of a rubber thrust bearing. The stresses are not transmitted through the ball bearing, which carries a low-variation load, since the low-variation load is modulated exclusively by the flexibility of the spring, even in the case of rapid deflections.

In an analogous manner, French Patent No. 2,563,302 to AB Volvo describes a device called a suspension strut mount in which a small space in the mount permits a short, free displacement between thrust bearings in the interior of the upper attachment of the shock absorber shaft, which attachment also carries the permanent load of the spring.

Improvements which introduce hydraulic damping into the upper attachment point of a shock absorber of a MacPherson tube generally rely on the attachment of the shock absorber shaft which receive the stress from the dynamic thrust at the vertical limit of travel as a consequence of the impact of the shock absorber tube impinging upon an elastomer thrust bearing.

This method of improving the vibratory comfort of a vehicle, by reducing the vibrations caused by stresses from the wheel, is described in French Patent Nos. 2,587,774 and 2,623,866 to Tokai Rubber. Such improvements may also apply exclusively to the connection of the shock absorber shaft to the body, or to analogous applications, without any concern as to the carrying of the permanent load by the suspension spring. These devices consist of a single piece having two opposite chambers connected together by a liquid conduit, the liquid conduit being wound about the outer diameter of the chambers. This conduit exhibits a great length and a considerable cross section. These devices, whose effects of inertia block any deformation if the shock absorber exerts rapid stresses, nevertheless permit deflections during slower movements due to guidance, either by means of a ring concentric with the attachment, whose elastomer material is pre-stressed in order to improve the resistance to fatigue, as in French Patent No. 2,587,774, or by means of an annular part with radial deflection, as in French Patent No. 2,623,866. Nevertheless, these deflections are generally limited by the integration of elastomer thrust bearings into the hydraulic chambers.

In another application, French Patent No. 2,356,847 to Automobiles Peugeot, describes an improved shock absorber device, having two chambers separated by a rigid partition. This rigid partition can be associated with an anti-torque link in order to provide reaction to engine torque as a complement of the suspension.

The design of such attachment devices can be very complex in order to provide the sole, very limited function of a point of elastic attachment. The fulfillment of the other described functions, such as the maintenance of a permanent force, requires a similar degree of complexity in order to provide the consistency of the level of quality demanded from the acoustic or vibratory filtering of the connections between an automobile chassis and a wheel or power unit suspension.

An analysis of the known devices shows that none of them meet all of these functions in a satisfactory, and simplistic manner. In other words, none of the known devices meet the requirement of transmitting a permanent load in all directions while still efficiently isolating the elastic connection from acoustic frequencies.

OBJECT OF THE INVENTION

It is an object of the present invention to integrate the various above-described functions into a single piece. By way of non-limiting examples, this can be accomplished by adding an appropriate hydraulic damping arrangement to the upper attachment point on the body of a vehicle for a strut in a MacPherson suspension, or at the attachment point on the body of an anti-torque link. The hydraulic damping should be brought about by means of a simple unit which is economical and well adapted for satisfying the requirements discussed above.

SUMMARY OF THE INVENTION

Accordingly, the present invention comprises a hydroelastic suspension attachment for a vehicle or a stationary machine, which hydroelastic suspension attachment is preferably formed by two thick membranes of an elastomer composition enclosing a relatively small volume of liquid. Such a unit essentially constitutes a hydroelastic cartridge.

The invention is preferably characterized in that the hydroelastic cartridge has a flap fitted with tight sealing joints, the flap itself being slidable along a cylindrical axis within the cartridge, and movable freely both axially and radially within a rigidly confined cup within the cartridge. The sliding flap is preferably encircled by a liquid passage which enables fluid communication between the two faces of the sliding flap by means of a clearance having a large cross section. At the time an effect of thrust enters into play, the inertial role assumed by the liquid passage brings about a high-level damping of the vibrations transmitted due to the movement between resonating masses.

In a preferred embodiment of the present invention, for the upper point of attachment of a telescopic shock absorber of the MacPherson type carrying the wheel spindle of either a front or rear wheel, the elastic connection is freed from any permanent suspension stresses in relation to those on an elastic attachment piece concentric with the hydroelastic attachment.

In another embodiment for the suspension of a power unit, the reaction to the engine torque or engine brake can be provided by a link called an anti-torque link, or also by a thrust bearing which performs the same role, via a hydroelastic attachment, in accordance with the present invention.

One aspect of the invention resides broadly in a MacPherson strut assembly for a wheel suspension of a motor vehicle, the MacPherson strut assembly comprising a shock absorber, a spring disposed about the shock absorber to support a body of the motor vehicle, and a hydroelastic attachment for being disposed between the body of the motor vehicle and the shock absorber to at least partially dampen transmission of vibrations between the shock absorber and the body of the motor vehicle. The hydroelastic attachment comprises at least a first and a second elastomeric member, the at least a first and a second elastomeric member forming a fluid chamber therebetween, the fluid chamber having a damping fluid therein, a damping device movably disposed within the fluid chamber, the damping device for dividing the fluid chamber into a first chamber portion and a second chamber portion, and a retaining apparatus disposed at least partially within the fluid chamber and substantially between the at least a first and a second elastomeric member, the retaining apparatus for movably retaining the damping device therein in a fixed relationship with respect to the at least a first and a second elastomeric member. The retaining apparatus with the damping device therein define a plane, and the damping device is movable within the retaining apparatus in a multiplicity of directions substantially within the plane. The damping device provides a fluid communication for damping passage of fluid between the first chamber portion and the second chamber portion to thereby dampen vibrations between the shock absorber and the body of the motor vehicle.

Another aspect of the invention resides broadly in a hydroelastic anti-torque link for recovery of engine torque, the anti torque link for mounting an engine to a frame and at least partially dampen transmission of vibrations from the engine to the frame. The anti-torque link comprises at least a first and a second elastomeric member, the at least a first and a second elastomeric member forming a fluid chamber therebetween, a damping device movably disposed within the fluid chamber, the damping device for dividing the fluid chamber into a first chamber portion and a second chamber portion, and retaining apparatus disposed at least partially within the fluid chamber and substantially between the at least a first and a second elastomeric member, the retaining apparatus for movably retaining the damping device therein in a fixed relationship with respect to the at least a first and a second elastomeric member. The retaining apparatus with the damping device therein defines a plane, the damping device is movable within the retaining apparatus in a multiplicity of directions substantially within the plane, and the damping device provides a fluid communication for damping passage of fluid between the first chamber portion and the second chamber portion to thereby dampen vibrations between the shock absorber and the body of the motor vehicle.

One additional aspect of the invention resides broadly in a hydroelastic attachment for being disposed between two masses to at least partially dampen transmission of vibrations between the two masses. The hydroelastic attachment comprises at least a first and a second elastomeric member, the at least a first and a second elastomeric member forming a fluid chamber therein, damping device movably disposed within the fluid chamber, the damping device for dividing the fluid chamber into a first chamber portion and a second chamber portion, and retaining apparatus disposed at least partially within the fluid chamber and substantially between the at least a first and a second elastomeric member, the retaining apparatus for movably retaining the damping device therein in a fixed relationship with respect to the at least a first and a second elastomeric member. The retaining apparatus defines a plane, the damping device is movable within the retaining apparatus in a multiplicity of directions substantially within the plane, and the damping device provides a fluid communication for passage damping of fluid between the first chamber portion and the second chamber portion, and damping vibrations between the two masses.

BRIEF DESCRIPTION OF THE DRAWINGS

The invention will be better understood from the description accompanying the drawings, in which.

DESCRIPTION OF THE PREFERRED EMBODIMENTS

Figure 1:
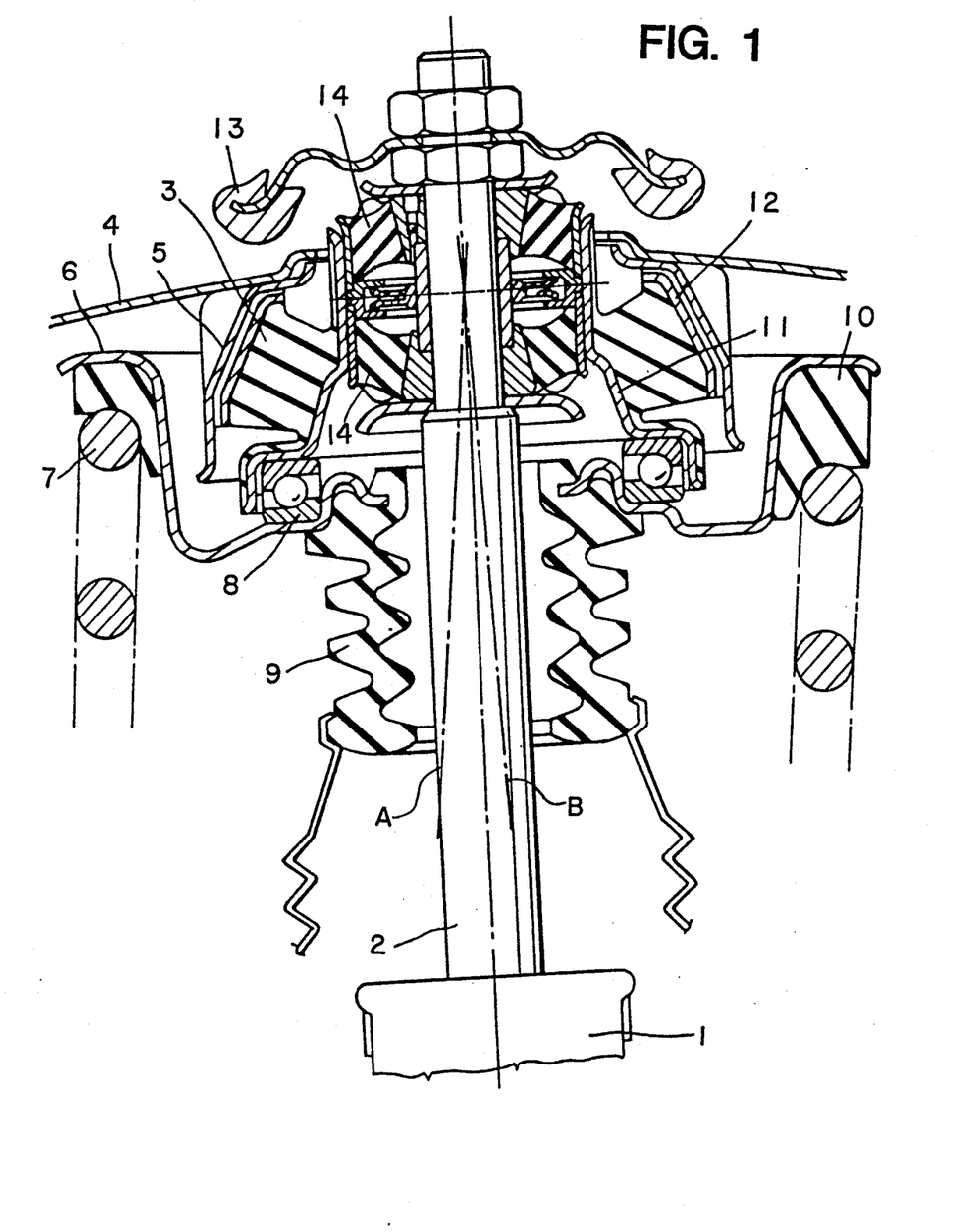
FIG. 1 shows, in cross section, the components which surround the upper attachment point of a shock absorber to the vehicle body, taken along the shaft axis of the shock absorber.

FIG. 1 shows, in a plane section passing through the axis of a shock absorber shaft, the assembly of the pieces surrounding the upper point of attachment of a shock absorber to a vehicle body. The shock absorber itself forms a suspension strut of the MacPherson type.

A shock absorber which carries the wheel spindle of a front wheel suspension at its lower end, typically has a telescopic strut 1 which is preferably capable of a large vertical deflection. In addition, to enable steering of the vehicle, this front shock absorber is also preferably pivotable around its shock absorber shaft 2. The common axis of the shock absorber is typically mounted vertically, but the shock absorber can usually oscillate within the deflections of the lower guide triangle (not shown) of the suspension system. These oscillations generally occur around the elastic attachment piece 3, at a slight angle whose limits are indicated by axes A and B. These limits indicated by axes A and B are representative only.

The upper cup 6 of the suspension spring 7 is generally located below the elastic attachment piece 3. This upper cup 6 preferably pivots on a ball thrust bearing 8, and the elastic attachment piece 3 is generally integral with the vehicle body 4. If necessary, the attachment piece 3 can be made integral with the body 4 via an attachment reinforcement 5.

In the arrangement shown in FIG. 1, the upper cup 6 carries the bearing 9 which limits any dynamic deflections of the shock absorber along its axis. This frees the upper attachment of shock absorber shaft 2 from any stress caused by occasional contact of the attachment with the end of the shock absorber 1 forming the strut.

The upper cup 6 also preferably has an elastic spring support 10 to primarily filter vibrations transmitted to the attachment piece. This spring support simplifies the configuration of the cup 6. However, despite the frequent existence of the elastic spring support 10 on the upper cup 6, the support of ball thrust bearing 8 is usually also additionally filtered against the transmission of direct vibrations. The incorporation of a layer of elastomeric composition into elastic attachment piece 3 provides a heightened degree of filtering. This elastomeric composition should preferably have a thickness greater than about one centimeter, and should preferably be intimately bonded to an internal frame 11, which internal frame carries the ball thrust bearing 8, and to an external frame 12 which essentially renders the elastomeric membranes integral with fixation reinforcement 5. This essentially conical layer of elastomeric composition forms the elastic fixation piece 3, and permits the rocking or tilting of the shock absorber shaft 2 between the limits defined by axes A and B.

This layer of elastomeric composition of elastic attachment piece 3, by virtue of its form, should preferably be sufficiently rigid in both an axial and a radial direction to provide the function of supporting the entire shock absorber around the ball joint, regardless of the stresses applied to the layer. Such stresses may include both radial stresses due to parasitic stresses on shock absorber shaft 2, and axial strains exerted via ball thrust stop 8. These axial strains may be exerted, on one hand, in a permanent manner by suspension spring 7, and on the other hand, in a manner by way of the bearing 9 for the dynamic limitation of deflections.

Moreover, a relaxation stop 13, which is preferably fixed by a metallic cup at the upper end of shock absorber shaft 2, can, during extreme dynamic movements, reduce the risk of excess pull on the elastic attachment piece 3 during relaxation, by virtue of antagonistic support on vehicle body 4 and its attachment reinforcement 5.

By freeing, as described above, the attachment of shock absorber shaft 2 from all excess stresses, the attachment of shock absorber shaft 2 can be made as a simple symmetrical piece which holds, by means of a simple fitting, the permanent support in a cylindrical part provided by internal frame 11. This simple piece is preferably constituted of a hydroelastic cartridge enclosed on each of its two faces by a thick membrane 14 of elastomeric composition. These membranes 14 provide the desired radial and axial rigidities for application of the cartridge in an elastomeric mount. The large dimensions of the thick membranes 14 guarantee high resistance to fatigue.

These two thick membranes 14 preferably enclose a relatively small volume of damping liquid and a sliding flap. The sliding flap, provided with tight sealing joints and enclosed in a rigid confinement cup, is preferably located in the vicinity of the plane of symmetry of the hydroelastic cartridge.

An assembly, analogous to the one presented above for a vehicle suspension, could also provide a highly flexible suspension for a stationary machine.

Figure 2:
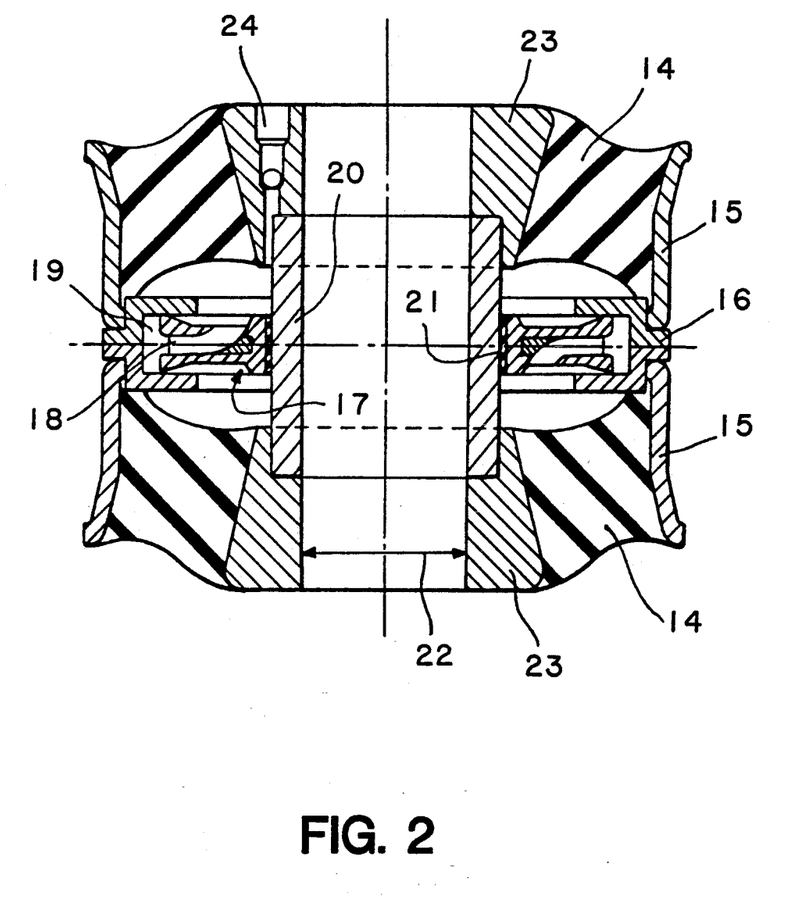
FIG. 2 shows an enlarged view of the same cross section as FIG. 1, but of only the hydroelastic cartridge providing the hydroelastic attachment at the attachment point in accordance with the present invention.

FIG. 2 is an enlargement of FIG. 1, showing only the hydroelastic cartridge.

This apparently simple cartridge assumes the attachment of the strut to the vehicle body, attachment which was previously realized, in known embodiments, through the use of elastic washers bolted between two cups. This cartridge can also provide, in a preferred embodiment of the invention, all the functions expected of a hydroelastic shock absorber that is mounted at the upper attachment point of a conventional hydraulic shock absorber.

Acting together with the main suspension shock absorber, the specific role of the cartridge is, on the one hand, to decouple the acoustic connection of the attachment on the body under certain specific conditions of frequencies where the periodic stresses are too weak to provide the sliding of both the shock absorber shaft 2 and the piston, and on the other hand, to dampen the periodic stresses.

In prior devices, the inability of the shaft to slide in the shock absorber tube actually permitted transmission of undesirable accelerations to the vehicle body. Such undesirable accelerations result from, in particular, the excitation of the power unit by the non-suspended masses of the vehicle during rolling on very smooth roads, a phenomenon which is generally termed "jerk". Within the frequency ranges which are most often close to about 10 to about 12 Hertz, an acceleration of about 1/100 of gravity is actually already distinctly perceptible to the human body. The interpositioning of the hydroelastic cartridge has a considerable effect on reducing the transmission of these accelerations, and thus improves the silence and comfort in the passenger compartment of the vehicle.

The hydroelastic cartridge unit shown in FIG. 2 is bounded by the two thick membranes 14, which are constituent elements of the hydroelastic cartridge unit. The membranes are each preferably intimately bonded to a tubular armature 15 constituting the external solid by means of which the unit is fitted into the bore of internal frame 11 of elastic attachment piece 3. The geometric configuration shown implies a preliminary fitting at each face, which operation also serves to provide the seal by means of an appropriate paste or adhesive.

The illustration of the hydroelastic cartridge clarifies, in the preferential application for a shock absorber attachment, the function provided by the device constituting the subject matter of the invention, complementary to the sole elastic connection. The thick membranes 14 of elastomeric composition preferably enclose a preferably small volume of damping liquid, and the lateral seal can be provided by the tightening of the tubular collars 15 to abut, in the plane of symmetry, against the shoulder of the rigid confinement cup 16. The confinement cup 16, which is advantageously made by molding reinforced plastic, can preferably be formed by two identical parts assembled, e.g., by adhesion. This rigid confinement cup 16 encloses the sliding flap 17 and the sealing joints located on each of the faces of the flap.

All the functions of the hydroelastic cartridge are due essentially to the particularities of operation of operation of the sliding flap 17, which flap turns the hydroelastic cartridge into a true hydroelastic shock absorber.

In fact, the large cross section liquid passage 18 is constituted by a fluid communication connecting each face of the sliding flap 17 with its edge. Two orifices, diametrically opposed and opening onto the edge of the sliding flap 17, allow passage of the liquid between each of the faces of the flap 17, which liquid passes, via the large cross section clearance 19, along the two semiperipheries of the sliding flap 17. Two fluxes of liquid therefore act in parallel between rigid confinement cup 16 and the sealing joints located on each of the faces of the sliding flap 17.

If an off-centering of the sliding flap 17 occurs due to a parasitic radial force on the shock absorber shaft 2, which force is elastically countered by the radial rigidity of the two thick membranes 14, there is still, nevertheless, a circulation of liquid, having a substantially constant section, within the cartridge and, consequently, a suppression of the stress exerted by the main shock absorber during significant, relatively slow axial movements. This suppression permits the characteristics to be defined for this main shock absorber, and imparts to the main shock absorber a considerable efficiency without disturbing passenger comfort to any appreciable extent, during large movements in which the effect of the main shock absorber is eliminated by the existence of the passage of liquid.

On the other hand, for rapid wheel movements, the effect of inertia acting on the mass of the liquid column fully intervenes to block the passage of the liquid from one face of the sliding flap 17 to the other face. The flap, in this situation, essentially functions as a piston that forces the liquid from one face of the flap to the other via the liquid passage 18. The above described inertial effect is caused by the relationship of the larger cross section of the sliding flap 17 to the smaller cross section of the liquid passage, multiplying, in the same relationship, the acceleration undergone by the liquid.

Under these conditions, the hydroelastic cartridge would behave like a single elastic solid if the sliding flap 17 were not present. The faces of this sliding flap 17 alternately contact rigid confinement cup 16 via the sealing joints. The movements, which are of a high frequency but of a low amplitude, are then completely filtered by the crushing stroke of the sealing joints and are therefore not transmitted by shock absorber shaft 2. The same applies to any radial component filtered by the radial play between the sliding flap 17 and the rigid confinement cup 16.

The vibratory comfort at acoustic frequencies is thereby considerably improved. A transverse stress, either permanent or of slow variation, on shock absorber shaft 2 can cause an elastic off-centering. This stress is countered and balanced by the radial rigidity of the thick membranes 14. On the other hand, any radial vibratory component can be totally "decoupled" at a low amplitude, and the sliding flap 17 can move off-center without any transmission of stress. However, the inertial effect of liquid passage 18 intervenes beyond a vibratory amplitude periodically exerted on the off-centering with a controllable damping which may or may not be different from the axial damping.

Axially, as well as radially, the effect of the hydroelastic attachment device, characterized by a low rigidity which brings about an efficient filtering at low frequencies, permits a high-level, visco-elastic damping in the intermediary frequencies, while the rigidity is rendered dynamically much greater in the high frequencies by the effect of inertia. The damping value, as measured by the difference in dephasing between the displacement and the reaction in a sinusoidal periodic stressing, and expressed by the tangent $\Phi$ of this dephasing, can reach 0.50 at a frequency of 12 Hertz. As a result of this fact, a damping rate of $\frac{1}{2}$ tangent $\Phi = 0.25$ is generally satisfactory for the specifications of the manufacturer.

This remarkably high damping rate has, as a mathematical consequence, a coefficient of transmission of the vibrations which does not exceed 2.3 even in full resonance (the forces are then in quadrature with the displacement).

Since any vibratory phenomenon can accumulate with a slow displacement of high amplitude, the sliding flap 17 has the possibility of maintaining its role of hydraulic blockage by shifting, by means of a sliding axial movement along cylindrical shaft 20, around which it is engaged. The flap is preferably provided with extra thicknesses forming seals 21 to provide a gliding seal on the shaft 20. The elasticity of these extra thicknesses forming sealing joints 21 is utilized in order to permit weak rockings, which shock absorber shaft 2, engaged in bore 22 of cylindrical shaft 20, can undergo relative to the aligned position without prejudicing the damping effect due to liquid passage 18, which surrounds the sliding flap 17 in conjunction with large cross sectional clearance 19. This cylindrical shaft also functions as a support between inner cones 23, which cones 23 constitute the frame intimately connected to thick membranes 14.

The seal between cylindrical shaft 20 and inner cones 23 for the damping liquid can preferably be provided by tightly fitting, during assembly, the cylindrical shaft 20 in a shoulder of limited length located in each inner cone 23. The filling of the hydroelastic cartridge can preferably be performed during the course of assembly, or immediately thereafter, by means of purge hole 24. After filling, this purge hole 24 can then be obturated, or blocked off, e.g., by a screw, stud, or ball forced into the purge hole 24 as shown.

Figure 3A:
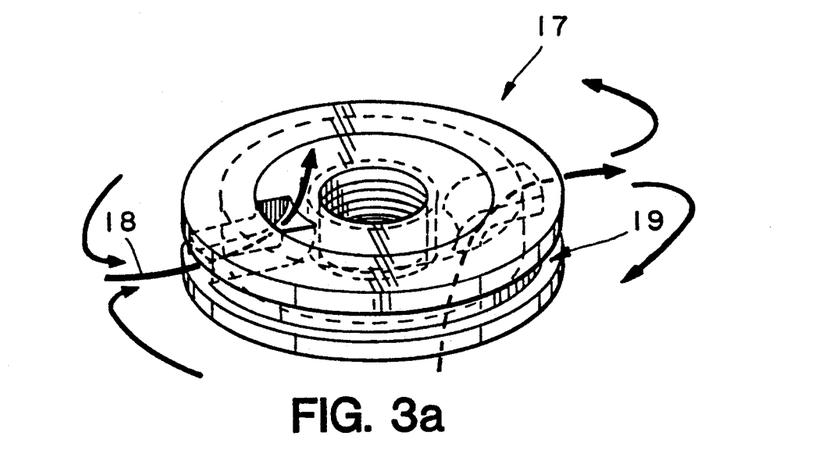
FIGS. 3a, 3b, and 3c respectively show perspective, plan, and sectional views of the piece forming the sliding flap that is provided with tight sealing joints, a feature of the present invention.
Figure 3B:
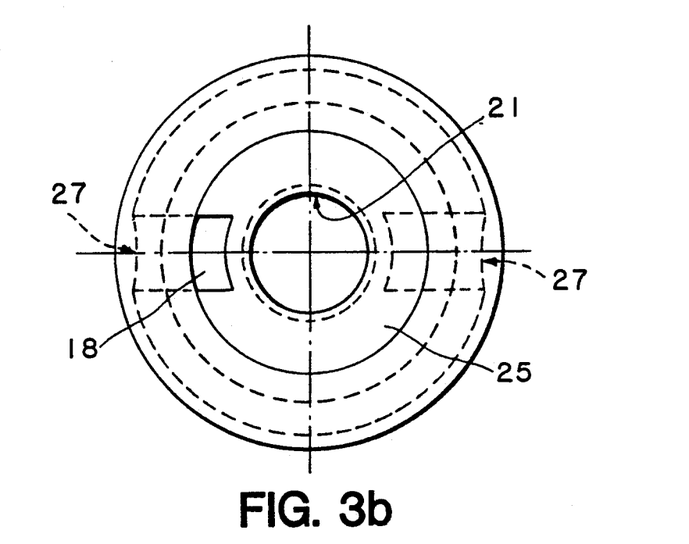
Figure 3C:
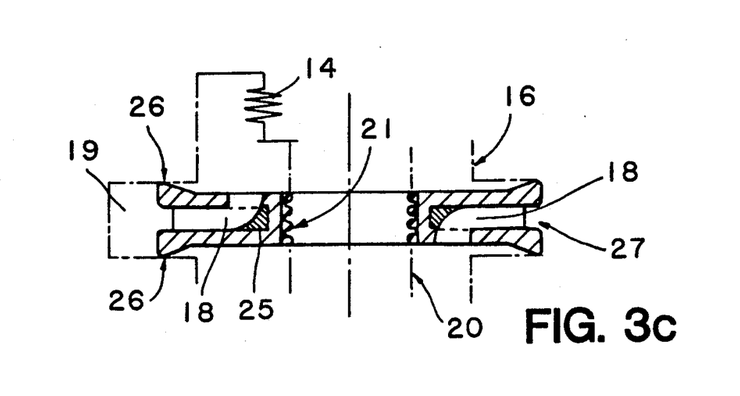

FIGS. 3a–3c show only the sliding flap 17 in perspective, plane, and sectional views, respectively.

FIG. 3a shows a perspective view which shows how liquid passage 18, formed by a curved groove in the thickness of the metallic part forming the sliding flap 17, can place one face of the flap in communication with clearance 19, which clearance 19 is preferably enclosed between the edge of the flap 17 and rigid confinement cup 16 which surrounds the flap 17.

FIG. 3b is a top plane view of the sliding flap 17 which flap can preferably be formed by metal washer 25, preferably milled on each face in such a manner as to establish the communication between liquid passage 18 and the hole on edge 27. This hole on edge 27 can be hollowed by the shape of the mold when the plane sealing joints 26 of elastomeric composition are created. The plane sealing joints 26 provide means by which the sliding flap 17 will be enclosed between the two inner faces of rigid confinement cup 16. The bore of metal washer 25 preferably also comprises the extra thicknesses forming sealing joints 21. These sealing joints 21 provide the sliding flap 17 with the ability to rock on cylindrical shaft 20, which shaft 20 carries the flap 17, while also forming a tight seal between the shaft 20 and the flap 17.

FIG. 3c is an axial section of the sliding flap 17, taken through the two holes on edge 27 in correspondence with the curved grooves which guide the two liquid passages 18 toward each face of the sliding flap 17. These curved grooves empty into a recess on the plane face, which recess is located inside each plane sealing joint 26.

The operation of the sliding flap 17 will now be clarified using FIG. 3c in which the outer connections are rendered schematically by dots and dashes.

Because the flap is centered by cylindrical shaft 20 which contacts the extra thicknesses forming sealing joints 21, and, since the flap is freed from any radial displacement by any off-centering permitted by its sliding between the two planar faces of rigid confinement cup 16 which surrounds it, sliding flap 17 can preferably be made from a very light mass of metal and elastomeric composition which can move axially between the alternate crushing of each plane sealing joint 26 with a high acoustic frequency and a low amplitude. This resonant phenomenon in which the sliding flap 17 plays the part of a resonating flap, lowers the effective rigidity of the elastic connection between shock absorber shaft 2 and the vehicle body 4 to the above-mentioned frequencies.

As soon as a slow axial movement permits the liquid to communicate between each face of sliding flap 17, via clearance 19, the static rigidity of the two thick membranes 14 preferably permits the main suspension shock absorber to enter into action by means of the quasi-static reaction of the latter. If the large-amplitude movement is rapid, the inertial effect of the column of liquid exerts a difference of pressure between the two faces of sliding flap 17, in spite of the possibility of communication between the two faces. Once the low stroke permitted by the crushing of plane sealing joints 26, is attained, the effective axial, dynamic rigidity of the elastic connection is cancelled out by the sliding of the sealing joints 21 along cylindrical shaft 20. The pressure differential created within the cartridge allows this sliding, in spite of the high tightening force of several decanewtons that is necessary to provide the seal. It is known to technicians in the anti-vibratory art that a maximum damping due to the difference in dephasing is produced between the following two phenomena: the first resulting from the simple static, axial rigidity, and the other from blockage due to inertial hydraulic effects.

The magnitude of the damping effect can be measured in the form of visco-elastic damping, although in reality the decoupling of the elastic shaft-body connection having apparently lower stiffness is due to the intervention of an inertia of liquid without any viscous character. Thus, the main suspension shock absorber acts in the deflections for which it is designed, but also appears virtually decoupled for the periodic movements of acoustic frequencies.

In known devices, the main shock absorber often appears blocked during excitations at the natural frequency of the non-suspended masses. As was mentioned above, this phenomenon is generally referred to as "jerk" when it excites the alternating stroke of the power group. On the other hand, in a device constituting the subject matter of the present invention, the main shock absorber is located in series with the elastic attachment device with a high rate of integrated damping, thus limiting the transmission of this resonant "jerk" phenomenon.

Figure 4:
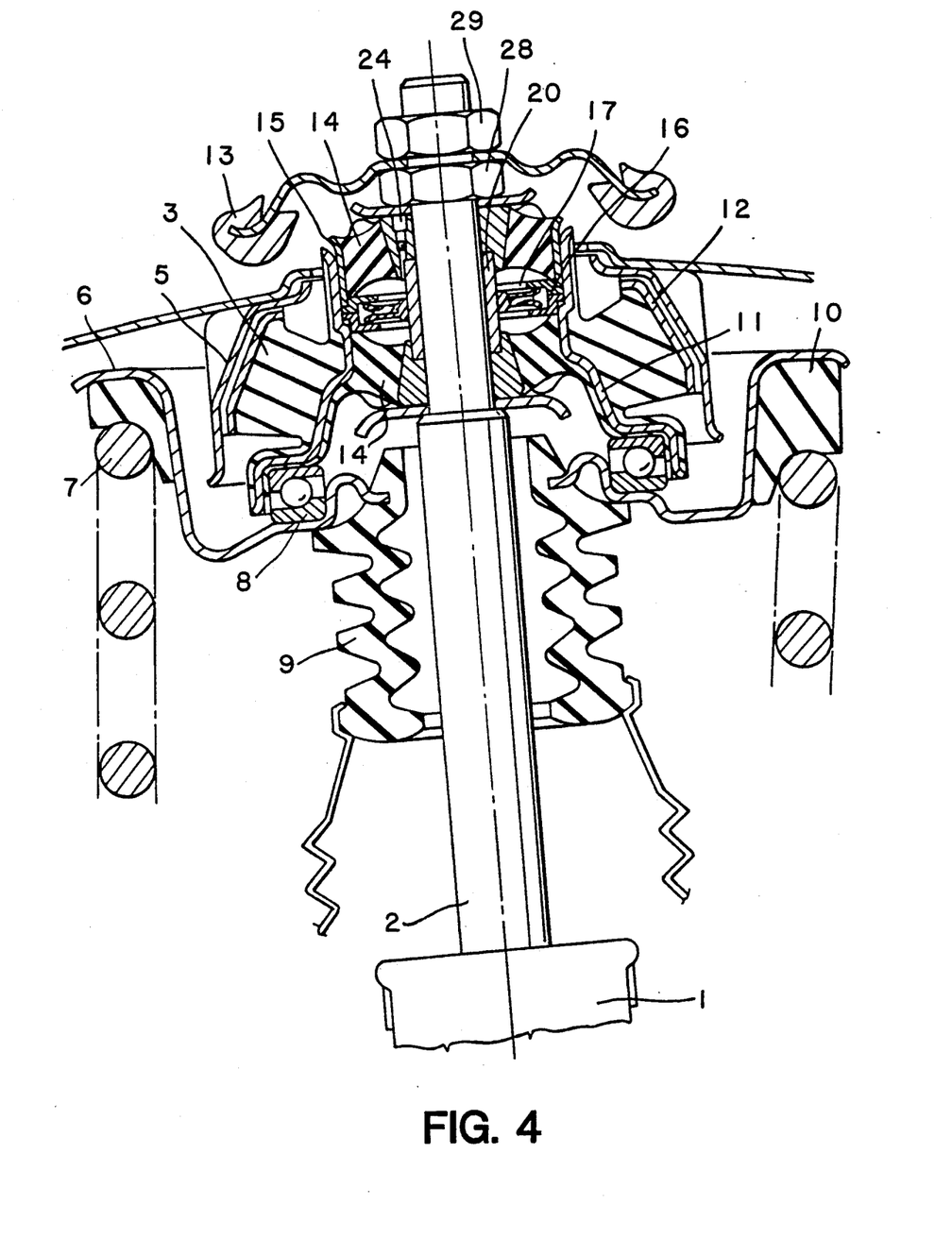
FIG. 4 shows a variation of the arrangement of the hydroelastic attachment which simplifies the manufacture thereof, and therefore permits mass production of the hydroelastic attachment.

FIG. 4 shows, under conditions identical to those of FIG. 1, a preferred variant of the hydroelastic attachment device. This variant is intended to reduce the number of components, and allow for an economical large-scale manufacture of the hydroelastic device. For the same arrangement of suspension spring 7, supported on upper cup 6 via elastic spring support 10, and of the bearing 9, for the dynamic limitation of deflections, the static and dynamic stresses are both exerted via the ball thrust bearing 8 on the inner frame 11 of the elastic fixation piece 3.

In this variant, the inner frame 11 materially forms an integral part of the hydroelastic cartridge, whose operation remains unchanged, due to the fact that this inner frame 11 can be intimately connected by adhesion, in situ, for example, to one of the thick membranes 14. The essentially conical layer, which can be one centimeter thick and which forms elastic fixation piece 3, can therefore preferably be fabricated during the course of the operation of molding the thick membrane 14, along with simultaneous adhesion, in situ, to outer frame 12, integrated, if necessary, to fixation reinforcement 5.

The preparation of this embodiment of the hydroelastic cartridge preferably comprises engaging the flap on the cylindrical shaft 20, and enclosing the flap within the rigid confinement cup 16, which can preferably be manufactured in two assembled parts, e.g., by gluing. This assembly can preferably be done simultaneously along with the fitting of the assembly to the second thick membrane 14 of elastomeric composition. The tubular collar 15 can preferably be engaged with an appropriate sealing compound in inner frame 11 of elastic attachment piece 3 whereas cylindrical shaft 20 should fit into the shoulders of each inner cone 23. It would be possible, if necessary, but not very economical, to integrate these three objects in a single piece, because cylindrical shaft 20, which functions as a brace, essentially requires a carefully prepared surface state, such as a chromed surface, in order to allow the sliding of the shaft within the sealing joints 21 of sliding flap 17. However, inner cones 23 require much less mechanical precision and can undergo the thermal cycle and the manipulations which integrate the inner cones, during molding, to each thick membrane 14. The constitution of an elastomeric layer forming a seal is also possible on the surface of the inner cones 23 which come in contact with cylindrical shaft 20.

This latter seal is generally necessary in order to avoid the loss of the filling liquid, generally an antifreeze water-glycol liquid, in the direction of shock absorber shaft 2, located in the bore of the unit constituted in this manner. The filling of the relatively small volume enclosed by the thick membranes 14 can preferably be performed by submersion during assembly, or also by means of alternating operations of creating a vacuum and then filling by means of purge hole 24 once assembly is essentially complete.

Figure 5:
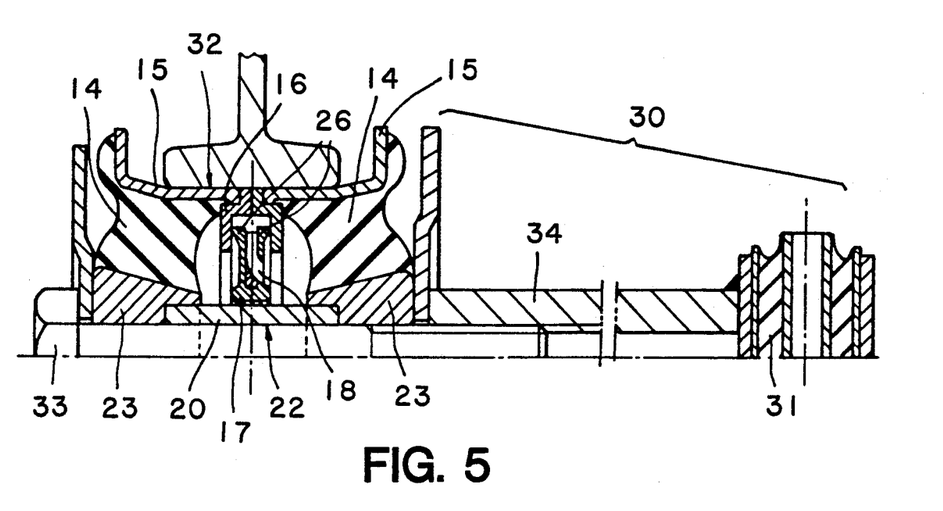
FIG. 5 shows, in axial half-section, an embodiment of the present invention wherein the hydroelastic cartridge acts as a link of a triangulation for a suspension system or for a recovery of torque, in accordance with the present invention.

FIG. 5 illustrates, in axial half-section, an application of the invention as a geometric connection link which is used advantageously for the recovery of torque in a suspension of a power unit. The mass of the power unit, elastically isolated from the chassis, can be arranged in such a manner that its center of gravity is located essentially straddling any elastic supports, thus producing a suspension which is very flexible in the vertical direction and very rigid in the horizontal direction. The reactions of the engine torque and of the engine brake, geared down by the transmission system, can then preferably be taken up by an essentially horizontal link 30 fixed to the body, and also to the power unit, at one end by a conventional elastic ring 31, and at the other end by a hydroelastic cartridge, essentially identical in all ways to the one previously described.

In fact, tubular collars 15 can be fixed by fitting them into cylindrical housing 32, which housing 32 has the same function as inner frame 11 of elastic attachment piece 3 previously described.

The two inner cones 23 can preferably be assembled by the alignment of their bores with bore 22 of cylindrical shaft 20, which shaft 20 braces them together by means of assembly screw 33 screwed into the threaded, tubular body of link 34. The two thick membranes 14 provide a great flexibility by means of their conjoint deformation under the effect of a permanent strain, and define a position of equilibrium for the flap 17 which is slidable along cylindrical shaft 20.

In these conditions of transmission of permanent stress, the flap 17 nevertheless moves with high frequency within rigid confinement cup 16, causing the axial crushing of flat sealing joints 26, and the radial displacement without stresses in the large cross section clearance 19.

During either vertical or transverse shifts of the power unit, the angular variations of the essentially horizontal link 30 bring about a rocking of the sliding flap 17 on cylindrical shaft 20. This rocking is permitted by the elasticity of the sealing joints 21.

When the vibratory phenomenon called "jerky ride" is produced when the acceleration pedal is let out, or during a start at low speed, low-frequency pulsations of approximately 4 Hertz, for example, have the tendency to excite a natural resonance mode in resonance with the pulsations of the engine torque.

The transfer of damping liquid via liquid passage 18 can be optimized then in such a manner as to bring about a damping of the pulsations at a visco-elastic value which can achieve a tangent $\Phi = 0.50$, which value corresponds to about 25% of the critical damping. Thus, the transmission of uncomfortable accelerations to the passenger compartment is avoided, as much as possible.

A geometric connection link like the one shown in FIG. 5 can also be used as an attachment for attaching the lower triangulation of a strut suspension unit to a vehicle.

Figure 6:
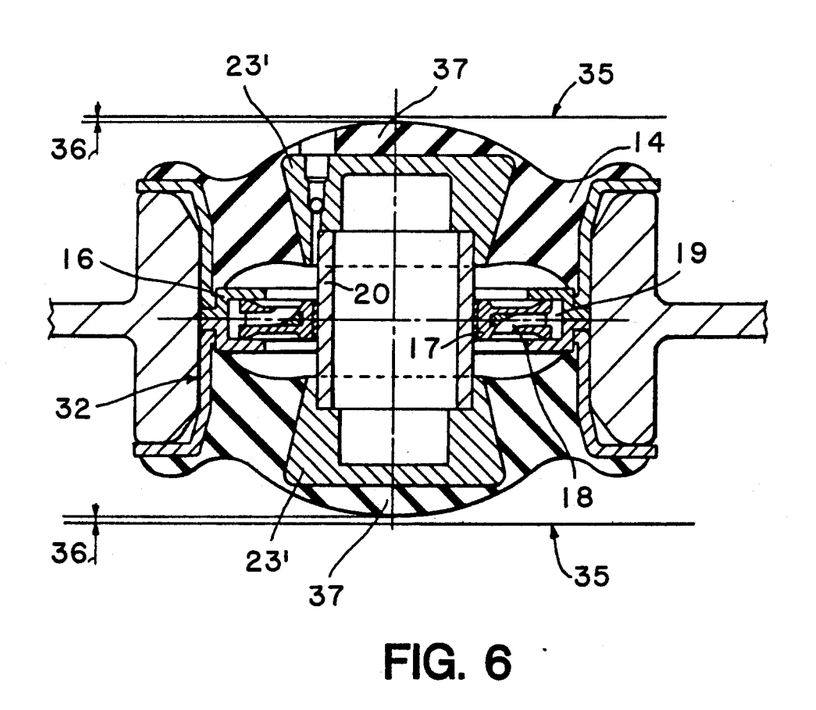
FIG. 6 shows, in axial section, the use of the hydroelastic cartridge as a hydroelastic suspension attachment which alternately comes into simple thrust contact with two rigid supports.

FIG. 6 illustrates, in axial section, the use of a hydroelastic cartridge as a hydroelastic suspension attachment which comes alternately into simple thrust contact with two rigid supports 35, each symbolized here as a plane. These planes are generally fixed to the chassis, for example, and cylindrical housing 32 can preferably be arranged on a casing of the power unit. The function of limited clearance 36 is applicable to the recovery of engine torque by reaction, on appropriate elastic supports, under the same conditions as the use of a link. Progressive thrust bearings, or bearing portions 37 are preferably arranged at the end of the inner cones 23', in a non-opening manner, around the chamber confining the small volume of damping liquid. These progressive thrust bearings 37 thus form an integral part of the hydroelastic cartridge.

In this usage, the constant value of the engine torque or brake is exerted by means of the support of a progressive thrust bearing 37 on one of rigid supports 35. The reaction exerted by axial deformation of the two thick membranes 14, thus, slidingly displaces the flap 17 along cylindrical shaft 20.

Since parasitic stresses can be exerted tangentially by means of the friction of progressive thrust bearing 37 on rigid support 35, the role of large cross section clearance 19 is justified. This clearance 19 permits the off-centerings of thick membranes 14 as well as any slight rockings of flap 17 on cylindrical shaft 20 due to the elasticity of the sealing joints 21.

During these deformations, the flap 17 continues to vibrate with very low inertia in rigid confinement cup 16 without transmitting the high-frequency vibrations. On the other hand, the role of the low-frequency shock absorber for absorbing the pulsations of engine torque is well exercised by the inertial effect of the large cross section liquid column, which liquid column is in transit along clearance 19 via liquid passage 18. Thus, the effect of the flap 17 is to considerably reduce the transmission of the pulsations of engine torque due to vibratory "jerky ride" phenomena, in order to prevent the pulsations from being translated into periodic low-frequency accelerations of e.g. approximately 4 Hertz.

Such accelerations are generally perceived as very uncomfortable above an intensity evaluated in the comfort norms of about 0.1 gravity or about 1 meter/second$^2$ and perceptible after about 0.005 gravity or about 5 centimeter/second$^2$.

The preferred process of fabrication of the hydroelastic cartridge applies to the production of a hydroelastic attachment for the upper point of a suspension strut as well as to the production of a hydroelastic cartridge with link or thrust bearings used for recovery of torque.

The manufacture of the device shown in either FIG. 1 or FIG. 4 comprises the preceding fabrication by the molding of three pieces using, e.g., in situ adhering of an elastomeric composition to rigid frames which are preferably of metal. These rigid frames are obtained by deformation of sheet metal or preferably from a tubular blank. The finishing of metal washer 25 constituting sliding flap 17 can preferably be provided by milling and lateral piercing.

The constitution of this first subassembly still requires, in order for it to be ready for delivery to an automobile assembly line, the assembly of ball thrust bearing 8 by means of fitting it likewise into inner frame 11 of elastic fixation piece 3.

The further preparation of a strut comprises the placing, onto this first subassembly, of suspension spring 7, its elastic support 10, and thrust bearing 9 for the dynamic limitation of deflections, onto upper cup 6 prior to the mounting of the assembly onto the shock absorber strut 1. This type of assembly typically requires the pre-compression of the suspension spring 7. This unit is retained under stress by the first nut 28, and the strut can then be delivered as a whole unit to the assembly line where it will be used.

In fact, in the arrangement shown, it is the hydroelastic cartridge which bears this pre-compression on the strut provisionally prepared in this manner. After the strut assembly is mounted on an automobile, the tightening of relaxation stop 13 by means of the second nut 29 can be substituted for the pre-compression provided up to then by the hydroelastic cartridge. This tightening of the relaxation stop 13 by means of nut 29 essentially frees the thick membranes 14 from all permanent stresses.

In a similar manner, an anti-torque link, such as shown in FIG. 5, as well as a hydroelastic attachment with incorporated thrust bearings, such as shown in FIG. 6, both fulfilling the same function, can essentially be realized as described above for the first subassembly.

The hydroelastic suspension attachment constituting the subject matter of the present invention exhibits the following advantages over known devices:

The hydroelastic suspension attachment of the present invention provides, since used in place of blocks of rubber, a considerably increased acoustic filtering of the direct path between the body or the chassis and the sources of noise;

In addition to total radial and axial filtering of vibrations, the hydroelastic suspension attachment of the present invention brings about a very efficient damping of accelerations due to the residual transmissibility of the direct transmissions of the resonance frequency between masses;

By virtue of the internal sliding of the sliding flap carried by the cylindrical shaft, the apparent elevated flexibility of the hydroelastic attachment of the present invention, during slow deflections, permits the modification of the position at which the effect of hydroelastic thrust is produced;

The hydroelastic suspension attachment of the present invention nevertheless behaves like an efficient hydroelastic thrust bearing by means of an elevated rigidity during operational deflections;

The important dimensions of the elastic parts that make up the hydroelastic suspension attachment of the present invention guarantee a good resistance to fatigue by means of the low stresses which result therefrom;

The replacing of pieces during repair operations remains easy to carry out; and

The realization of a main suspension shock absorber can be simplified because the components of the shock absorber are protected from the most frequent small oscillations which strain them when the hydroelastic attachment is used at the upper attachment point of a main suspension shock absorber.

Of course, an expert in the art will be able to associate combinations of variants of the hydroelastic attachment constituting the subject matter of the invention with various types of elastic fixations, including areas other than those of automobile suspension, without departing from the scope of the invention.

In summary, one feature of the invention resides broadly in a hydroelastic suspension attachment in a vehicle body or in a stationary machine, the attachment being formed by two thick membranes 14 of an elastomer composition and enclosing a relatively reduced volume of liquid. This unit forms a hydroelastic cartridge, characterized in that in this hydroelastic cartridge, a flap provided with sealing joints 17 and slidable on a cylindrical axle 20, can move freely axially and radially in a rigidly confined cup 16. This sliding flap provided with sealing joints 17 is surrounded itself by the circulation of a liquid passage 18 which allows the two faces of the sliding flap provided with sealing joints 17 to communicate between one another by means of a clearance 19 having a large cross section. The inertial role of the liquid leakage column 18, at the time an effect of thrust enters into play, brings about a high-level damping of the vibrations transmitted due to the movement resonating between masses.

An additional feature of the invention resides broadly in the hydroelastic suspension attachment characterized in that for application at the upper point of fixation of a telescopic shock absorber of the MacPherson type on the body in a vehicle suspension of the MacPherson type carrying the spindle of a wheel, either leading or non-leading, the elastic connection is freed from the suspension stresses in relation to those on an elastic fixation piece 3 concentric to the hydroelastic cartridge and that the static stresses of the suspension spring 7 and those of a thrust bearing for the dynamic limitation of deflections 9 are exerted through a ball thrust bearing 8 on the inner frame 11 of the elastic fixation piece 3.

One additional feature of the invention resides broadly in the hydroelastic attachment of a telescopic shock absorber characterized in that the damping of the elastic connection provided by the two thick membranes 14 between the shock absorber shaft 2 and the vehicle body 4, measured by the visco-elastic damping at a frequency of 10 to 12 Hertz, reaches the value of $\frac{1}{2}$ tangent $\Phi=0.25$ on the rigidity of the elastic connection.

A further additional feature of the invention resides broadly in the hydroelastic attachment of a telescopic shock absorber characterized in that the sliding flap provided with sealing joints 17 is equipped on its inner diameter with extra thicknesses forming sealing joints 21 on the cylindrical shaft 20 which permit it to slide and also to rock around the elastic fixation piece 3 when considerable strains, radial or from rocking, are exerted by the shock absorber shaft 2 and that the sliding is produced without prejudicing the damping effect due to the liquid leakage column 18 which surrounds the sliding flap provided with sealing joints 17 via the large cross section clearance 19 both in axial deflection as well as in radial deflection.

A yet further additional feature of the invention resides broadly in the hydroelastic attachment of a telescopic shock absorber characterized in that the hydroelastic cartridge formed by the two thick membranes 14 of elastomeric composition, and of a relatively reduced volume of liquid forms an integral part of the elastic fixation piece 3 by means of intimate connection due to an adhering in situ of its inner frame 11 to one of the thick membranes 14 of elastomeric composition.

Another additional feature of the invention resides broadly in the hydroelastic suspension attachment characterized in that for application to the recovery of engine torque or engine brake, the reaction to this torque is recovered by an essentially horizontal link 30 fixed to the body and to the power unit at one of its ends by the unit constituting the hydroelastic cartridge.

Another additional feature of the invention resides broadly in the hydroelastic suspension attachment characterized in that for application to the recovery of engine torque or engine brake, the reaction to this torque is recovered by the support of two progressive thrust bearings 37 on rigid supports 35 and that these thrust bearings form an integral part of the hydroelastic cartridge.

Another additional feature of the invention resides broadly in the hydroelastic suspension attachment for application to the recovery of an engine characterized in that the damping of the elastic connection provided by the two thick membranes 14 of elastomeric composition, measured by the visco-elastic damping at a frequency of approximately 4 Hertz, reaches the value of $\frac{1}{2}$ tangent $\Phi=0.25$ on the rigidity of the elastic connection.

Another additional feature of the invention resides broadly in the hydroelastic suspension attachment for application to a horizontal link characterized in that the sliding flap provided with sealing joints 17 is equipped on its inner diameter with extra thicknesses forming sealing joints 21 on the cylindrical shaft 20 which permit it to slide and also to rock around the axis of the cylindrical housing 32 when considerable stresses, radial or of rocking, are exerted by the essentially horizontal link 30 in its vertical or transversal deflections.

Another additional feature of the invention resides broadly in the hydroelastic suspension attachment for the application to thrust bearings characterized in that the sliding flap provided with sealing joints 17 is equipped on its inner diameter with extra thicknesses forming sealing joints 21 on the cylindrical shaft 20 which permit it to rock around the cylindrical shaft when parasitic stresses are exerted tangentially by friction of one of the progressive thrust bearings 37 on a rigid support 35.

Another additional feature of the invention resides broadly in a geometric connection link, characterized in that one of its ends is connected to a hydroelastic suspension attachment in order to provide the fixation to the body of a lower triangulation of a strut suspension unit for vehicles.

All, or substantially all, of the components and methods of the various embodiments may be used with at least one embodiment or all of the embodiments, if any, described herein.

The appended drawings, in their entirety, including all dimensions, proportions and/or shapes of the invention, are, if applicable, approximate and are hereby incorporated by reference into this specification.

The invention as described hereinabove in the context of the preferred embodiments is not to be taken as limited to all of the provide details thereof, since modifications and variations thereof may be made without departing from the spirit and scope of the invention.

What is claimed is:

1. A MacPherson strut assembly for a wheel suspension of a motor vehicle, said MacPherson strut assembly comprising:

a shock absorber;

spring means disposed about said shock absorber to support a body of the motor vehicle; and hydroelastic attachment means for being disposed between the body of the motor vehicle and the shock absorber to at least partially dampen transmission of vibrations between the shock absorber and the body of the motor vehicle, said hydroelastic attachment means comprising:

at least a first and a second elastomeric member, said at least a first and a second embodiment member forming a fluid chamber therebetween, the fluid chamber having a damping fluid therein;

damping means movable disposed within said fluid chamber, said damping means for dividing said fluid chamber into a first chamber portion and a second chamber portion;

retaining means disposed at least partially within said fluid chamber and substantially between said at least a first and a second elastomeric member;

said retaining means for movably retaining said damping means therein in a fixed relationship with respect to said at least a first and a second elastomeric member;

said retaining means with said damping means therein define a plane, said damping means being movable within said retaining means in a multiplicity of directions substantially within the plane;

said retaining means having an essentially U-shaped cross section comprising a base portion with two essentially parallel arm portions projecting substantially perpendicularly from the base portion;

said arm portions of said retaining means retaining said damping means within said retaining means;

said damping means has an outer dimension;

said retaining means has an inner dimension defined by the base portion, and an inner dimension defined by the arm portions;

the outer dimension of said damping means being less than the inner dimension of the base portion of the retaining means and greater than the inner dimension of the arm portions of the retaining means, thereby forming a clearance between said damping means and said retaining means, said clearance allowing for said moving of said damping means within said retaining means; and said damping means providing fluid communication means for passage of damping fluid between said first chamber portion and said second chamber portion to thereby dampen vibrations between said shock absorber and the body of the motor vehicle.

2. The MacPherson strut assembly according to claim 1, wherein:

said damping means comprises flap means;

said flap means has an orifice passing therethrough;

said shock absorber further comprises a shaft means, said shaft means defining an axis;

said shaft means of said shock absorber passing through the orifice of said flap means such that the axis of said shaft means is substantially perpendicular to the plane of said flap means within said retaining means;

said flap means is slidable on said shaft means in a direction along the shaft axis;

said flap means further comprises sealing means disposed within the orifice for providing a seal between the flap means and the shaft means passing therethrough; and said shaft means is rockable within the orifice of said flap means.

3. The MacPherson strut assembly according to claim 2, wherein said hydroelastic attachment means further comprises:

a spring support for maintaining said spring means in an at least partially compressed state about said shock absorber;

connecting means for connecting said hydroelastic attachment means to the body of the vehicle; and at least one thrust bearing disposed substantially between said spring support and said shock absorber shaft means, said thrust bearing for absorbing axial deflections of the shock absorber along a direction substantially parallel to the shock absorber axis.

4. The MacPherson strut assembly according to claim 3, wherein:

the damping provided by the hydroelastic attachment means reaches a value of ½ tangent Φ equal to about 0.25 at a dampening frequency of about 10 to about 12 Hertz; and the hydroelastic attachment means has a coefficient of vibration transmission less than about 2.3.

5. The MacPherson strut assembly according to claim 4, wherein:

said flap means further comprises:

a first surface;

a second surface substantially parallel to said first surface; and a peripheral edge;

said first surface and said second surface each having about their peripheral edge a sealing means for sealing between the flap means and the arm portions of the retaining means;

said fluid communication comprises:

at least one first passage connected between said first surface and said peripheral edge of said flap means;

groove means disposed about said peripheral edge; and at least one second passage connected between said second surface and said peripheral edge of said flap means, one of said at least one first passage and one of said at least one second passage being diametrically opposite within said flap means.

6. The MacPherson strut assembly according to claim 5, wherein:

said connecting means for connecting said hydroelastic attachment means to the body of the vehicle comprises a conical elastomeric layer, said elastomeric layer allowing for rocking of the hydroelastic attachment and shock absorber within the connecting means;

said elastomeric layer has a thickness, and the thickness of the elastomeric layer is greater than about one centimeter;

said MacPherson strut assembly further comprises relaxation stop means for limiting the axial stroke of the hydroelastic attachment and shock absorber within the connecting means;

said attachment means additionally comprises collar means disposed at least partially about said at least a first and a second elastomeric member;

said at least a first and a second elastomeric member are intimately bonded to said collar means;

said retaining means is rigidly fixed with said collar means; and said collar means is rigidly attached to said connecting means.

7. The MacPherson strut assembly according to claim 6, wherein:

said collar means is disposed at least partially about one of said at least a first and a second elastomeric member;

said one of said at least a first and a second elastomeric member is intimately bonded to said collar means; and the other of said at least a first and a second elastomeric member of said hydroelastic attachment is intimately bonded to said connecting means.

8. A hydroelastic anti-torque link for recovery of engine torque, said anti-torque link for linking an engine to a chassis and at least partially damping transmission of vibrations from the engine to the chassis, said anti-torque link comprising:

at least a first and a second elastomeric member, said at least a first and a second elastomeric member forming a fluid chamber therebetween;

damping means movably disposed within said fluid chamber, said damping means for dividing said fluid chamber into a first chamber portion and a second chamber portion;

retaining means disposed at least partially within said fluid chamber and substantially between said at least a first and a second elastomeric member;

said retaining means for movably retaining said damping means therein in a fixed relationship with respect to said at least a first and a second elastomeric member;

said retaining means with said damping means therein define a plane, said damping means being movable within said retaining means in a multiplicity of directions substantially within the plane;

said retaining means having an essentially U-shaped cross section comprising as base portion with two essentially parallel arm portions projecting substantially perpendicularly from the base portion;

said arm portions of said retaining means retaining said damping means within said retaining means;

said damping means has an outer dimension;

said retaining means has an inner dimension defined by the base portion, and an inner dimension defined by the arm portions;

the outer dimension of said damping means being less than the inner dimension of the base portion of the retaining means and greater than the inner dimension of the arm portions of the retaining means, thereby forming a clearance between said damping means and said retaining means, said clearance allowing for said moving of said damping means within said retaining means; and said damping means providing fluid communication means for passage of damping fluid between said first chamber portion and said second chamber portion to thereby dampen vibrations between said engine and the chassis of the motor vehicle.

9. The anti-torque link according to claim 8, wherein:
said damping means comprises flap means;
said flap means has an orifice passing therethrough;
said anti-torque link further comprises a cylindrical shaft means, said cylindrical shaft means defining an axis;
said cylindrical shaft means passing through the orifice of said flap means such that the axis of said cylindrical shaft means is substantially perpendicular to the plane of said flap means within said retaining means;
said flap means is slidable on said cylindrical shaft means in a direction along the shaft axis;

said flap means further comprises sealing means disposed within the orifice for providing a seal between the flap means and the cylindrical shaft means passing therethrough;
said cylindrical shaft means is rockable within the orifice aid flap means.

10. The anti-torque link according to claim 9, wherein:
the damping provided by the hydroelastic anti-torque link reaches a value of $\frac{1}{2}$ tangent $\Phi$ equal to about 0.25 at a damping frequency of about 4 Hertz; and
the hydroelastic anti-torque link has a coefficient of vibration transmission less than about 2.3.

11. The anti-torque link according to claim 10, wherein:
said flap means further comprises:
a first surface;
a second surface substantially parallel to said first surface; and
a peripheral edge;
said first surface and said second surface each having about their peripheral edge a sealing means for sealing between the flap means and the arm portions of the retaining means;
said fluid communication comprises:
at least one first passage connected between said first surface and said peripheral edge of said flap means;
groove means disposed about said peripheral edge; and
at least one second passage connected between said second surface and said peripheral edge of said flap means, one of said at least one first passage and one of said at least one second passage being diametrically opposite within said flap means.

12. The anti-torque link according to claim 11, wherein:
said attachment means additionally comprises collar means disposed at least partially about said at least a first and a second elastomeric member;
said at least a first and a second elastomeric member are intimately bonded to said collar means;
said retaining means is rigidly fixed with said collar means; and
said collar means is rigidly attached to the engine.

13. A hydroelastic attachment for being disposed between two masses to at least partially dampen transmission of vibrations between the two masses, said hydroelastic attachment comprising:
at least a first and a second elastomeric member, said at a first and a second elastomeric member forming a fluid chamber therein;
each of said at least a first and a second elastomeric member is intimately bonded to a conical shaped inner frame;
said conical shaped inner frame having a common axis;
said conical shaped inner frame comprising load bearing means;
said load bearing means coming alternately into contact with one of two rigid support means fixed on the two masses;
damping means movably disposed within said fluid chamber, said damping means for dividing said fluid chamber into a first chamber portion and a second chamber portion;

retaining means disposed at least partially within said fluid chamber and substantially between said at least a first and a second elastomeric member;

said retaining means for receiving said damping means therein to movably retain said damping means in a fixed relationship with respect to said at least a first and a second elastomeric member;

said retaining means defining a plane, said damping means being rockable within said retaining means in a multiplicity of directions substantially within the plane; and said damping means providing fluid communication means for passage of damping fluid between said first chamber portion and said second chamber portion, and damping vibrations between the two masses.

14. The hydroelastic attachment according to claim 13, wherein:

said damping means comprises flap means;

said flap means has an orifice passing therethrough;

said hydroelastic attachment further comprises cylindrical shaft means on said axis of said conical shaped frames;

said cylindrical shaft means passing through the orifice of said flap means such that the axis of said cylindrical shaft means is substantially perpendicular to the plane of said flap means within said retaining means;

said flap means is slidable on said cylindrical shaft means in a direction along the cylindrical; shaft axis;

said flap means further comprises sealing means disposed within the orifice for providing a seal between the flap means and the cylindrical shaft means passing therethrough; and said cylindrical shaft means is rockable within the orifice of said flap means.

15. The hydroelastic attachment according to claim 14, wherein:

the damping provided by the hydroelastic attachment reaches a value of ½ tangent Φ equal to about 0.25 at a damping frequency of about 4 Hertz; and the hydroelastic attachment has a coefficient of vibration transmission less than about 2.3.

16. The hydroelastic attachment according to claim 15, wherein:

said retaining means has an essentially U-shaped cross section comprising a base portion with two essentially parallel arm portions projecting substantially perpendicularly therefrom;

said flap means has an outer dimension;

said retaining means has an inner dimension defined by the base portion, and an inner dimension defined by the arm portions;

the outer dimension of said flap means is less than the inner dimension of the base portion of the retaining means and greater than the inner dimension of the arm portions of the retaining means, thereby forming a clearance between said flap means and said retaining means, said clearance allowing for said sliding of said flap means within said retaining means; and said arm portions of said retaining means retaining said flap means within said retaining means.

17. The hydroelastic attachment according to claim 16, wherein:

said hydroelastic attachment further comprises collar means disposed at least partially around said at least a first and a second elastomeric member;

said at least a first and a second elastomeric member are intimately bonded to said collar means;

said retaining means is rigidly attached to said collar means; and said collar means is connected to one of said two masses.

18. A hydroelastic cartridge for attachment between two masses to at least partially dampen transmission of vibrations from one of the two masses to the other, said hydroelastic cartridge comprising:

at least a first and a second elastomeric member, said at least a first and a second elastomeric member forming a fluid chamber therebetween;

damping means movably disposed within said fluid chamber, said damping means for dividing said fluid chamber into a first chamber portion and a second chamber portion;

said damping means comprising flap means;

retaining means disposed at least partially within said fluid chamber and substantially between said at least a first and a second elastomeric member;

said retaining means for movably retaining said damping means therein in a fixed relationship with respect to said at least a first and a second a elastomeric member;

said retaining means with said damping means therein define a plane, said damping means being movable within said retaining means in a multiplicity of direction substantially within the plane; and said damping means providing fluid communication means for passage of damping fluid between said first chamber portion and said second chamber portion to thereby dampen vibrations between the two masses;

said flap means comprising:
a first surface;
a second surface substantially parallel to said first surface; and
a peripheral edge;

said first surface and said second surface each having about their peripheral edge a sealing means for sealing between the flap means and the retaining means;

said fluid communication comprising:
at least one first passage connected between said first surface and said peripheral edge of said flap means;
groove means disposed about said peripheral edge; and
at least one second passage connected between said second surface and said peripheral edge of said flap means. one of said at least one first passage and one of said at least one second passage being diametrically opposite within said flap means;

said flap means has an orifice passing therethrough from said first surface to said second surface;

said hydroelastic cartridge further includes tubular member means passing through the orifice;

said tubular member means having a first end embedded in one of said at least a first and a second elastomeric member, and a second end embedded in the other of said at least a first and a second elastomeric member;

said flap means is slidable on said tubular member means passing through the orifice;

said flap means further comprises sealing means disposed within the orifice for providing a seal between the flap means and the tubular member means to prevent leakage of fluid from the first chamber portion to the second chamber portion;

said tubular member means is rockable within the orifice of said flap means; and the fluid is an anti-freeze water-glycol solution.

* * * * *

UNITED STATES PATENT AND TRADEMARK OFFICE
CERTIFICATE OF CORRECTION

PATENT NO. : 5,232,209
DATED : August 3, 1993
INVENTOR(S) : Etienne de FONTENAY

It is certified that error appears in the above-indentified patent and that said Letters Patent is hereby corrected as shown below:

In column 8, line 23, after 'particularities', delete "of operation".

In column 17, line 7, Claim 1, after 'means', delete "movable" and insert --movably--.

In column 18, line 15, Claim 4, after 'a', delete "dampening" and insert --damping--.

In column 19, line 34, Claim 8, after 'comprising', delete "as" and insert --a--.

In column 20, line 6, Claim 9, after 'orifice', delete "aid" and insert --of said--.

Signed and Sealed this

Seventeenth Day of May, 1994

Attest:

BRUCE LEHMAN

*Attesting Officer*   Commissioner of Patents and Trademarks